United States Patent
Fu et al.

(10) Patent No.: US 10,607,414 B2
(45) Date of Patent: Mar. 31, 2020

(54) METHOD AND DEVICE FOR SEEING THROUGH AN OBSTRUCTION BASED ON SMART GLASSES, AND COMPUTER-READABLE STORAGE MEDIUM

(71) Applicant: SHENZHEN INSTITUTES OF ADVANCED TECHNOLOGY CHINESE ACADEMY OF SCIENCES, Shenzhen, Guangdong (CN)

(72) Inventors: Nan Fu, Guangdong (CN); Yaoqin Xie, Guangdong (CN); Yanchun Zhu, Guangdong (CN); Shaode Yu, Guangdong (CN); Yili Chen, Guangdong (CN); Zhicheng Zhang, Guangdong (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 16/008,815

(22) Filed: Jun. 14, 2018

(65) Prior Publication Data

US 2018/0300954 A1 Oct. 18, 2018

Related U.S. Application Data

(63) Continuation of application No. PCT/CN2016/084002, filed on May 31, 2016.

(51) Int. Cl.
*G06T 19/00* (2011.01)
*G06T 3/00* (2006.01)
(Continued)

(52) U.S. Cl.
CPC ........ *G06T 19/006* (2013.01); *G02B 27/0172* (2013.01); *G06T 3/00* (2013.01);
(Continued)

(58) Field of Classification Search
CPC ....... G06T 19/006; G06T 3/00; G06T 3/0068; G06T 11/60; G06T 5/005; G06T 5/50
See application file for complete search history.

(56) References Cited

U.S. PATENT DOCUMENTS

| 8,395,490 B2 | 3/2013 | Yuda |
| 2014/0340516 A1 | 11/2014 | Vojtisek et al. |

(Continued)

FOREIGN PATENT DOCUMENTS

| CN | 101925930 | 12/2010 |
| CN | 103358996 | 10/2013 |

(Continued)

OTHER PUBLICATIONS

Written Opinion of the International Searching Authority ISA/237, issued in the corresponding PCT application No. PCT/CN2016/084002, original and translation, WIPO, dated Feb. 14, 2017, 9 pages. (Year: 2017).*

(Continued)

*Primary Examiner* — Jeffery A Brier
(74) *Attorney, Agent, or Firm* — Bayramoglu Law Offices LLC

(57) ABSTRACT

The invention provides a method and a device for seeing through an obstruction based on smart glasses, and a computer-readable storage medium, the method comprising: acquiring a first image of user's view by smart glasses and recognizing an obstruction image in the first image; acquiring a second image of the user's view by at least one image acquisition device; replacing the obstruction image in the first image with portion of the second image that corresponds to the obstruction image, which are spliced to generate an unobstruction image of the user's view. In the invention, the obstruction image in the first image is replaced with a portion of the second image that corresponds to the obstruction image, which can achieve seeing through an obstruction.

12 Claims, 11 Drawing Sheets

(51) Int. Cl.
*G06T 7/33* (2017.01)
*G06T 5/00* (2006.01)
*G02B 27/01* (2006.01)
*G06T 15/20* (2011.01)
*H04N 7/18* (2006.01)

(52) U.S. Cl.
CPC ............... *G06T 5/005* (2013.01); *G06T 7/33* (2017.01); *G06T 15/205* (2013.01); *G02B 2027/014* (2013.01); *G02B 2027/0138* (2013.01); *G02B 2027/0178* (2013.01); *G06T 3/0068* (2013.01); *G06T 7/337* (2017.01); *G06T 2207/30268* (2013.01); *G06T 2219/2004* (2013.01); *H04N 7/18* (2013.01)

(56) References Cited

U.S. PATENT DOCUMENTS

2015/0235398 A1* 8/2015 Kim .................. G02B 27/0101
345/633

2015/0312468 A1* 10/2015 Taylor ................ H04N 5/23206
348/47
2016/0189408 A1* 6/2016 Chen ...................... G06T 5/006
345/629
2018/0120900 A1* 5/2018 Takahashi .......... H04N 5/23296

FOREIGN PATENT DOCUMENTS

| | | |
|---|---|---|
| CN | 104163133 | 11/2014 |
| CN | 106056534 | 10/2016 |
| JP | 200004395 | 1/2000 |
| JP | 2008143701 | 6/2008 |
| JP | 2008143701 A * | 6/2008 |

OTHER PUBLICATIONS

International Search Report, issued in the corresponding PCT application No. PCT/CN2016/084002, dated Feb. 14, 2017, 6 pages.

* cited by examiner

METHOD AND DEVICE FOR SEEING THROUGH AN OBSTRUCTION BASED ON SMART GLASSES, AND COMPUTER-READABLE STORAGE MEDIUM

TECHNICAL FIELD

The present invention relates to the technical field of Human-Computer Interaction, in particular a method and device for seeing through an obstruction based on smart glasses, and a computer-readable storage medium.

BACKGROUND

In the case of presence of an obstruction, it is generally easy to form a visual blind area. An observer cannot obtain view of the part obstructed by the obstruction so as to easily cause kinds of problems. For example, columns of windshields in various driving cabs may form visual blind area, and car doors may also block view of the observer. In recent years, due to development of smart glasses, it is possible to see through objects. However, current smart glasses can only be used for seeing through the inner structure of an object, rather than the whole object, such as an obstruction, and the object can be seen through only when the image of the inner structure of the object is known in advance.

SUMMARY

The present invention provides a method and device for seeing through an obstruction based on smart glasses, to solve the problem that current smart glasses cannot see through the obstruction.

The present invention provides a method for seeing through an obstruction based on smart glasses, which includes: acquiring a first image of user's view by smart glasses and recognizing an obstruction image in the first image; acquiring a second image of the user's view by at least one image acquisition device; replacing the obstruction image in the first image with the portion in the second image that corresponds to the obstruction image, which are spliced to generate an unobstruction image of the user's view.

In addition, the present invention further provides a computer-readable storage medium including computer-readable instructions, when being executed, the computer-readable instructions cause a processor to perform at least operations of the method for seeing through an obstruction based on smart glasses.

Meanwhile, the invention further provides a device, which includes:

an image acquisition module for acquiring images of user's view;

a storage for storing program instructions;

a processor which is connected with the image acquisition module and the storage, for executing the program instructions in the storage, and for processing the images of the user's view in accordance with the steps of the method for seeing through an obstruction based on smart glasses as above mentioned.

The method and the device for seeing through an obstruction based on smart glasses according to an embodiment of the invention and the computer-readable storage medium analyze and recognize the position and the image of an obstruction in the view by many methods using images of a user's view which are acquired by a camera of smart glasses, acquire an image of the obstructed view by an external image acquisition device, and replace the obstructed portion with an image acquired by an external detector, then register and splice the replacement image with the image of the user's view. In this way, an image obstructed by an obstruction can be seen when the obstruction is observed using the smart glasses, thus resulting in an effect of seeing through the obstruction, thereby effectively removing blind spots in the user's view that are caused by the obstruction.

BRIEF DESCRIPTION OF DRAWINGS

In order to more clearly explain the embodiments of the present invention or the technical solutions in the prior art, the accompanying drawings that need to be used in the embodiments or prior art will be simply introduced as follow. Obviously, the accompanying drawings in the following description are merely some examples of the present invention, and a person skilled in the art can obtain other accompanying drawings from them without paying any creative effort. In the drawings.

DESCRIPTION OF EMBODIMENTS

In order to more clearly explain purposes, technical solutions and advantages according to an embodiment of the invention, hereinafter the embodiment of the invention is further described in detail in combination with drawings. Here in the text, the exemplary embodiments of the invention and the description thereof are used for explaining the invention, but do not constitute definition of the invention. In the embodiment of the invention, the order of the steps is merely for schematically describing the process of implementing the method, and the order of the steps can be adjusted suitably as needed, the present invention has no limitation to this.

The method for seeing through an obstruction based on smart glasses according to the invention, in a state that smart glasses are worn, creatively utilizes an auxiliary detector, such as an external camera, and acquires an image of the obstructed portion by using the auxiliary detector, or in other words, the detector can cover a visual blind area of the user that is obstructed by the obstruction, then the obstructed portion is spliced with the image acquired by the detector so as to obtain an image of the visual blind area. An obstruction in the view is transparentized, thereby achieving the purpose of eliminating visual blind area.

Figure 1:
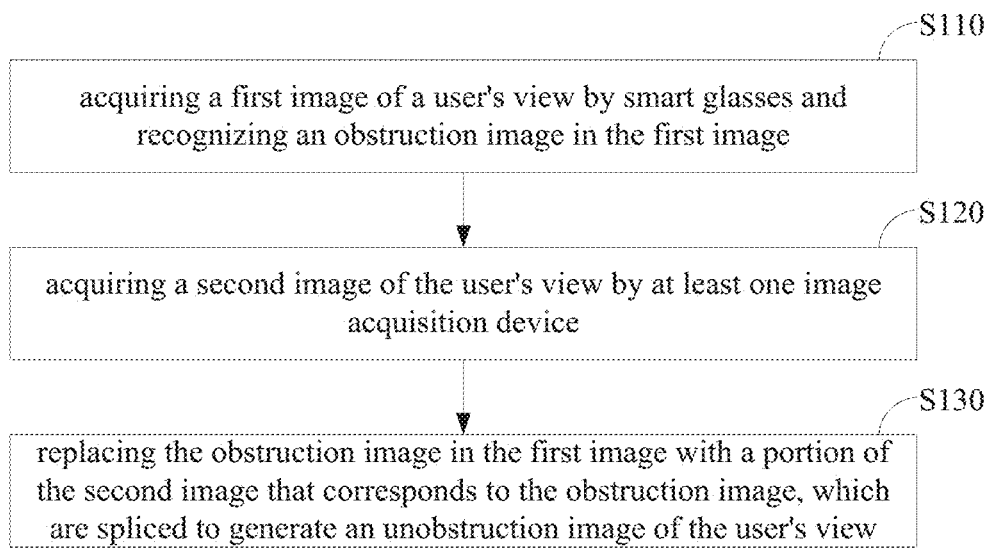
FIG. 1 is a flowchart of a method for seeing through an obstruction based on smart glasses according to an embodiment of the invention.

FIG. 1 is a flowchart of a method for seeing through an obstruction based on smart glasses according to an embodiment of the invention. As shown in FIG. 1, the method for seeing through an obstruction based on smart glasses according to an embodiment of the invention may comprise the following steps:

S110: acquiring a first image of a user's view by smart glasses and recognizing an obstruction image in the first image;

S120: acquiring a second image of the user's view by at least one image acquisition device;

S130: replacing the obstruction image in the first image with a portion of the second image that corresponds to the obstruction image, which are spliced so as to generate an unobstruction image of the user's view.

In the step S110, the smart glasses can be all kinds of different smart glasses on which an image acquisition device is generally disposed, such as a camera. The above-described user generally refers to a user wearing the above smart glasses. Because the position in which the image acquisition device of the smart glasses located is very close to the position of the eyes, the image seen by the user can also be seen by the smart glasses. A obstruction may cause blind spots to be generated in the user's view, the portion obstructed by an obstruction cannot be observed by the user. For example, stand columns of the car window may block parts of the view of a person in the car.

In an embodiment, it can be approximately regarded that the images seen by the user and by the smart glasses are the same, simple deformation of the images can be omitted, so as to simplify image processing process.

In another embodiment, difference between the user's view, i.e., natural view, and the image seen by the image acquisition device of the smart glasses can be corrected or rectified based on position relationship between the eyes and the image acquisition device of the smart glasses, thereby improving realness of an image on a display screen of the smart glasses, and improving user's experience.

In an embodiment, difference between the user's view, i.e., natural view, and the image seen by the image acquisition device of the smart glasses can be corrected by a camera calibration method using a bi-camera. Specifically, one camera can be placed at the position of the eyes, a calibration plate image acquired by the camera is compared with a calibration plate image acquired by the camera of the smart glasses so as to obtain a transformation matrix T of a image. All of the images acquired by the smart glasses are transformed by the matrix T before being displayed to the eyes, so as to obtain an image acquired and displayed approximately at position of the eyes.

The first image can be acquired by an image acquisition device on the smart glasses. An obstruction image in the first image can be obtained by performing image analysis by a processor of the smart glasses or an additionally disposed processor, i.e., whether an obstruction is in the user's view or not can be judged. There may be a plurality of obstructions in the user's view, and the above-described obstruction image may be in plural. In an embodiment, an obstruction shot by the camera of the smart glasses can be recognized so as to judge which part of the image is used to replace the obstruction. The process of recognition using the smart glasses may also be assisted by a gyroscope equipment of the smart glasses itself, thereby the camera of the smart glasses can recognize whether there is an obstruction in the view or not and the obstruction is replaced with a corresponding image. Because the visual blind area of the whole view can be covered by the image acquisition device, images around the obstruction and the obstructed image can be spliced effectively, so as to better judge the position of the view and to replace it with the corresponding image.

In an embodiment, the smart glasses may be perspective-type smart glasses. A display screen of the perspective-type smart glasses may allow natural light to penetrate, so as to ensure that the user can see a natural and real view at the same time of observing the image displayed on the smart glasses. The image generated by the smart glassless can overlap with a target image in the real view, part of the obstruction image in the real view is covered by the processed image of the smart glasses, so as to achieve the effect of seeing through the obstruction. The obstructed image can be acquired and obtained by one or more image acquisition device, wherein at least one image acquisition device may not be obstructed by the obstruction.

In the step S120, the image acquisition device may be various devices capable of acquiring images, such as a camera, an infrared image detector, etc. The above-described image acquisition device may be installed at various different positions as long as it can shoot the image of the user's view that is obstructed by the obstruction. In other words, the position of the view obstructed by the obstruction needs to be covered, i.e., the visual blind area of the user need to be covered, the image of the obstructed portion can be acquired, for example, the image acquisition device is disposed at a position of the edge of the car roof, and thus can cover the visual blind area of stand columns of a car window.

Preferably, the above-described image acquisition device is disposed on back side of the obstruction, thereby ensuring that the image of the user's view that is obstructed by the obstruction can certainly be acquired.

In an embodiment, when images of the view that are obstructed by all obstructions can be shot by one of the image acquisition devices, the second image above-mentioned may be acquired by using only one image acquisition device. In another embodiment, images of different portions of the view obstructed by the obstruction are shot simultaneously using a plurality of image acquisition devices, the images acquired by different image acquisition devices can be spliced together to generate an image including a view obstructed by all or overall obstruction.

In an embodiment, the positions of the image acquisition device above described and the obstruction are relatively fixed, thereby greatly reducing computation burden of image processing and thus improving image processing effect.

In the step S130, a portion of the second image that corresponds to the obstruction image may refer to an image of the user's view obstructed by the obstruction. For example, stand columns of a car window block traffic lights within the user's view, a portion of the second image that corresponds to the obstruction image may be an image of the traffic lights. An image after seeing through the obstruction can be known from the unobstruction image. The image acquired by the image acquisition device above described can be transmitted in many ways, such as in a wireless or wired way, to a processor to be processed. The processor may be a processor on the smart glasses or an additionally provided processor. The image acquisition device can acquire an image of the user's view obstructed by the obstruction in real time, and can update the unobstruction image displayed on the display screen of the smart glasses in real time.

In the embodiment of the invention, the image including the user's view obstructed by the obstruction is acquired by the image acquisition device, without knowing in advance the image obstructed by the obstruction. By replacing the obstruction image in the first image with portions of the second image that correspond to the obstruction image and splicing the portions so as to generate the unobstruction image of the user's view, to see through the whole obstruction. In this way, defects of the existing smart glasses that can only see through the inner structure of the object rather than the whole object, and limitations of the existing smart glasses that an image of the inner structure of the object needs to be known in advance can be broken through.

Figure 2:
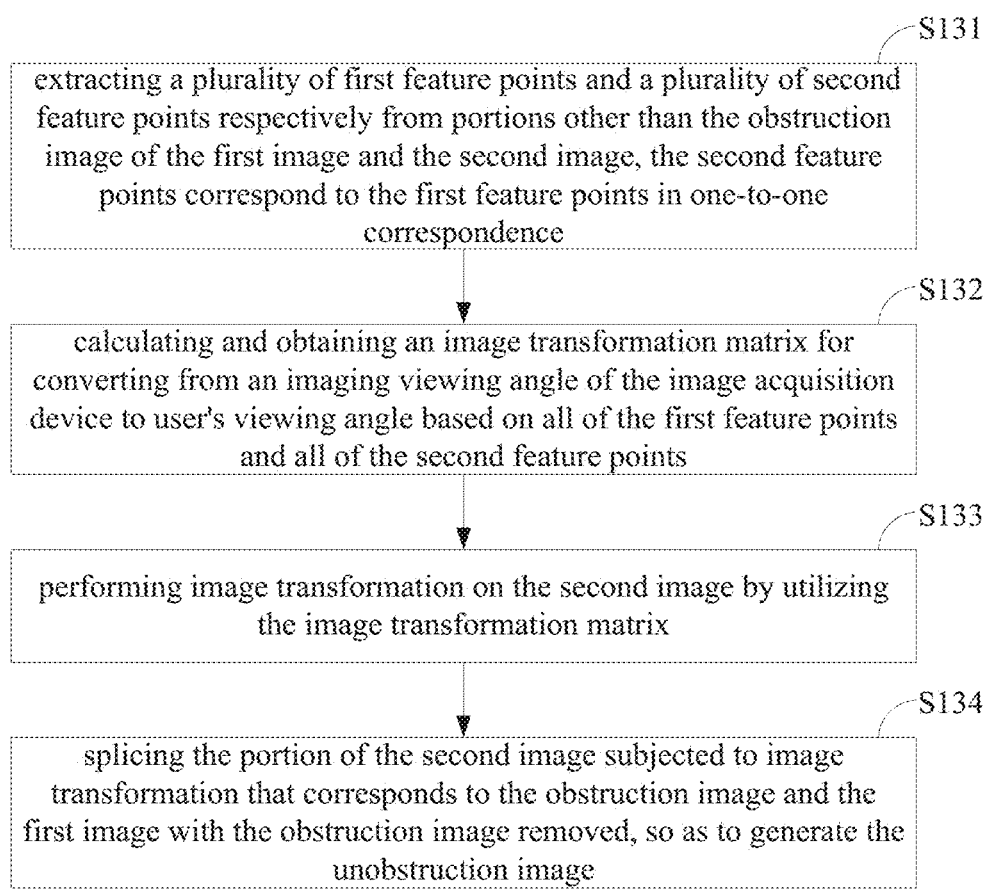
FIG. 2 is a flowchart of a method for splicing and generating an unobstruction image of the user's view according to an embodiment of the invention.

FIG. 2 is a flowchart of a method for splicing and generating an unobstruction image of the user's view according to an embodiment of the invention. As shown in FIG. 2, in the step S130, the method for splicing and generating an unobstruction image of the user's view by replacing the obstruction image in the first image with portions of the second image that correspond to the obstruction image, comprises the following steps:

S131: extracting a plurality of first feature points and a plurality of second feature points respectively from image portions other than the obstruction image of the first image and the second image, the second feature points correspond to the first feature points in one-to-one correspondence;

S132: calculating and obtaining an image transformation matrix for transforming from an imaging viewing angle of the image acquisition device into the user's viewing angle based on all of the first feature points and all of the second feature points;

S133: performing image transformation on the second image by utilizing the image transformation matrix;

S134: splicing the portion of the second image subjected to image transformation that corresponds to the obstruction image and the first image with the obstruction image removed, so as to generate the unobstruction image.

In the step S131, the first feature points and the second feature points may be points in respective images that can reflect shape of an object, such as a vertex point or an inflection point of an object in the image, which can be obtained from the gradient changes of intensity of the points. Specifically, which points in the images can serve as feature points can be determined as needed. The second feature points correspond to the first feature points in one-to-one correspondence, which means that the second feature points and the first feature points are points on images in the user's view that correspond to the same point picture. The more the feature points are, the more accurate the image splicing is. In an embodiment, there are at least five pairs of paired feature points (the first feature points and the second feature points appear in pairs), which is beneficial for the correction and the stability of image transformation matrix result.

In an embodiment, all of the first feature points in image portions other than the obstruction image of the first image can be extracted, all of the second feature points in the second image can be extracted, and feature vectors and feature values of corresponding feature points can be recorded, further the extracted all first feature points and all second feature points are matched based on the feature vectors and the feature values, and the first features and the second feature points that are matched successfully are used for calculating the image transformation matrix, i.e., number of the first feature points that are extracted initially may be different from the number of the second feature points that are extracted initially, for example, the number of the second feature points is larger than the number of the first feature points.

In the steps S132-S133, the second image is shot from the imaging viewing angle of the image acquisition device, the first image is shot from the user's viewing angle. When the imaging viewing angle and the user's viewing angle are different, relative deformation generally presents in the common portion of the second image and the first image. Image transformation is performed on the second image using the image transformation matrix, and the second image is transformed from the imaging viewing angle of the image acquisition device to the user's viewing angle, thus image deformation problem can be eliminated.

The step S134 includes: comparing the first image with the transformed second image so as to obtain a portion of the transformed second image that corresponds to the obstruction image; removing the obstruction image from the first image; then splicing the portion of the transformed second image that corresponds to the obstruction image with the first image with the obstruction image removed.

There are many kinds of feature extraction algorithms, for example, an image is blurred for many times, and a vector matrix is obtained by differentiating the images before and after being blurred each time. In this way, it can be searched in the nearby area, e.g 3*3*3 cube, the points in the center of the cube are surrounded by other 8 points. If the center point's value is greater or lower than the other 8 points, it should be a feature point. A feature vector of a feature point and gradients of the feature point in all directions are recorded at the same time as feature values of the feature point. If feature values of two feature points and feature vectors of the two feature points are respectively the same, it can also be regarded that the two feature points are the same one, i.e., corresponding to each other. The transformation matrix may be a 3*3 matrix. This 3*3 matrix can be obtained by obtaining a minimum variance by solving an equation from the feature points.

In the embodiment, the second image is image-transformed by the image transformation matrix above described and then is spliced so as to generate an unobstruction image, thereby preventing the problems that imaging of the obstructed portion is not intuitive enough, the user's view is confused and thus the normal view of the user is affected, in the case that an imaging viewing angle of the image acquisition device is not consistent with an angle of view of the user (an imaging viewing angle of the smart glasses).

In an embodiment, in the step S131, the method of extracting a plurality of first feature points and a plurality of second feature points respectively from image portions other than the obstruction image of the first image and the second image may be implemented specifically by extracting a plurality of first feature points and a plurality of second feature points respectively from image portions other than the obstruction image of the first image and the second image by a feature extraction algorithm.

Inflection points may be extracted by the above feature extraction algorithm. A inflection point refers to a point that greatly changes and differs from other surrounding pixel points. For example, if an image has a vertical edge, obviously left and right sides of the edge both change and differ greatly from a pixel of the line on which the edge is located, but this edge cannot be served as a feature point (i.e., an inflection point) because an edge is a line and there are too many points on a line, it is impossible to accurately judge which point can serve as an inflection point. For another example, if two edges intersect, there must be an intersection, and this intersection differs greatly from its surrounding pixels in any direction. This intersection is a unique one and will not produce multiple inflection points along the edge, so that this intersection can be selected as a feature point, i.e., an inflection point. Thus it can be seen that a feature point may generally be at a sharp-angled position of an object in the image. The feature point includes the first feature point and the second feature point.

In an embodiment, in the step S134, the setting pixel width area of an edge of the first image with the obstruction image removed includes part of the obstruction image. In the embodiment, the part of the obstruction image is removed while the obstructed edge portion is reserved, which may be the basis of image splicing and can improve image splicing quality. When the obstructed portion is removed, the unobstructed portion may be reserved. When the image is spliced, the portion of the image that splices the unobstructed portion with the obstructed portion may be processed when being displayed, such that the displaying looks more natural. The value of the reserved edge portion may use a fixed pixel, or the number of pixels reserved, should be determined by the difference of the pixels' value of the joined pictures. In an embodiment, the width of the edge portion is not less than 5 pixels, thereby facilitating the smooth of the image displaying.

In another embodiment, the width of the edge portion may be 0-5 pixels, or an edge of the obstruction may be expanded such that the removed obstruction image may be larger than an actual obstruction image, thereby the spliced image looks more natural and more smooth.

Figure 3:
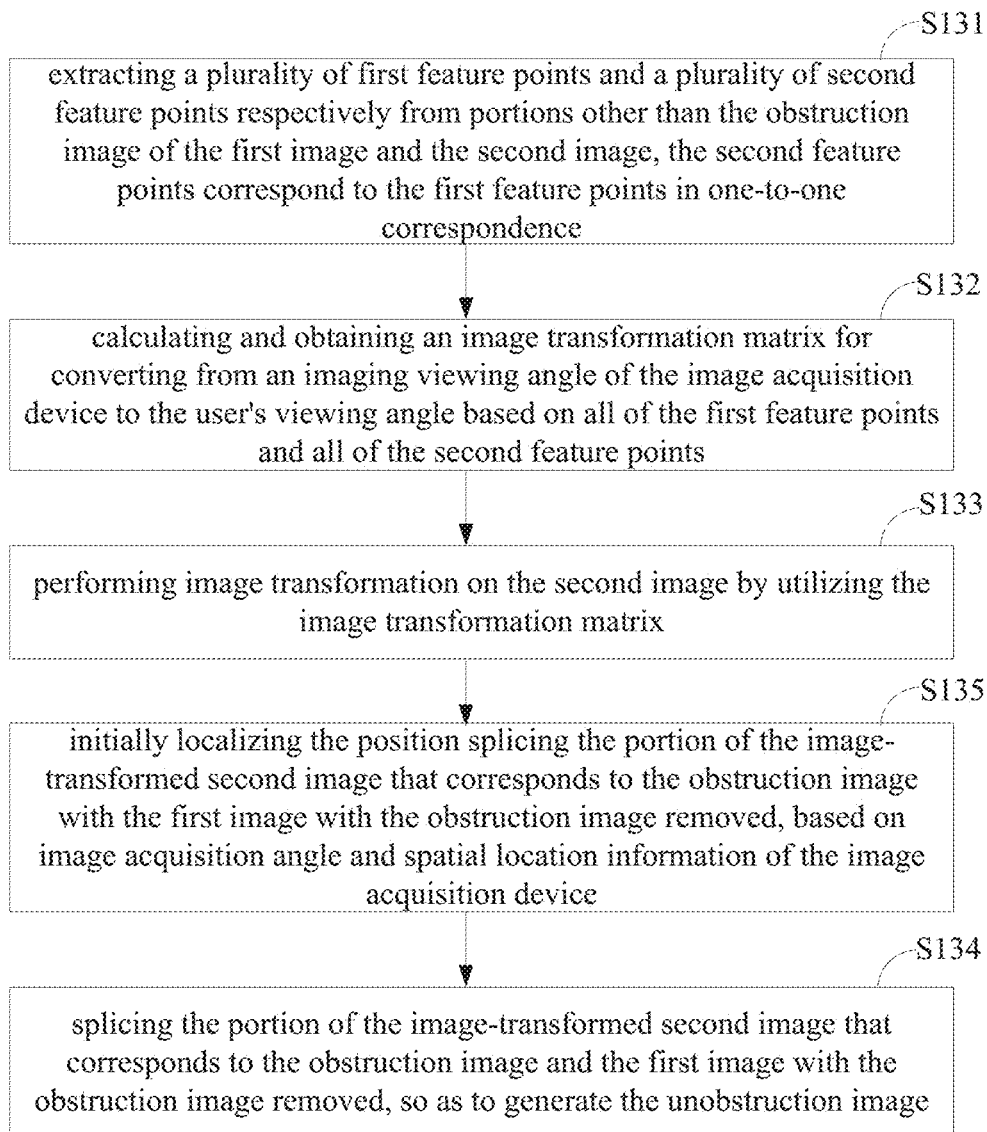
FIG. 3 is a flowchart of a method for splicing and generating an unobstruction image of the user's view according to another embodiment of the invention.

FIG. 3 is a flowchart of a method for splicing and generating an unobstruction image of the user's view according to another embodiment of the invention. As shown in FIG. 3, the method for splicing and generating an unobstruction image of the user's view as shown in FIG. 2, before splicing the portion of the image-transformed second image that corresponds to the obstruction image with the first image with the obstruction image removed so as to generate the unobstruction image (step S134), may further comprise the following steps:

S135: initially localizing the position splicing the portion of the image-transformed second image that corresponds to the obstruction image with the first image with the obstruction image removed, based on image acquisition angle and spatial location information of the image acquisition device. In the embodiment, image splicing may be accelerated by referring to information such as angle and position of an external image acquisition device as initial localization information of image splicing.

In the step S135, preferably the positions of the image acquisition device and the obstruction are relatively fixed, there is a certain relative relationship between the obstructed image and an image acquired by the image acquisition device. The spatial position information may be a relative spatial position of the image acquisition device and the obstruction. At this time, when the position of the obstruction is found, information of the relative spatial position may be recorded. On this condition, it can be regarded that there is no relative movement between the obstruction and the image acquisition device, so that the relative spatial position can be localized as position information of the obstruction and the image splicing is performed utilizing the position information. For example, if there is an obstruction in an angle direction, information acquired by the image acquisition device in this angle direction can be used to replace the obstruction image. In this way, when splicing images using the smart glasses, the scope in an image in which corresponding feature points (first feature points and corresponding second feature points) need to be searched in the splicing process can be greatly reduced, thereby improving image processing speed. In an embodiment, meanwhile a gyroscope of the smart glasses itself can be utilized to supply information such as direction, angle relationship between the obstruction and the user of the smart glasses can be known in advance, that is, whether the user observes towards the direction of the obstruction or not, and this can be an auxiliary basis for judging whether to display a perspective image or a splicing budget. In an embodiment, in the case that there may be multiple image acquisition devices, relative positions between multiple image acquisition devices may be fixed, hereby images of the multiple image acquisition devices are spliced for one time, after that it is only necessary to reserve the image transformation matrix and apply it to a new image, and it is not necessary to extract features and look for corresponding feature points of the image at each time, thus improving the image processing speed.

In an embodiment, in the step S110, the method of recognizing the obstruction image in the first image by the smart glasses may be implemented specifically by recognizing the obstruction image in the first image based on a constant property of the obstruction or a graphic marker on the obstruction.

Specifically, the obstruction image can be recognized based on, for example, a boundary region where the graphic marker is located. An image boundary can be extracted from the first image during image processing, such that the whole first image can be divided into many regions, the region where the constant property or the graphic marker is located can be regarded as an obstruction, and the image of the region can be replaced.

In the embodiment, the graphic marker may be a unique marker that is preset on the obstruction, for recognizing the obstruction. The method of recognizing the obstruction image in the first image can include recognizing color, pattern, relative position or feature identifier or the like of the obstruction. Color may mean that the color of the obstruction is relatively constant, which can be defined in a certain range through acquisition over a period of time, such that the object having such color can be weighted somewhat in judgment of the obstruction. The pattern and the feature identifier are in substance the same, we can also use particular pattern as a marker for obstruction recognition to mark the outline of the pattern object as the obstruction. The relative position may mean that relative relationship between the obstruction and the user is recorded in the manner of a gyroscope, so as to be applied in recognition of the obstruction. The method of recognizing the obstruction may be an object recognition algorithm.

A feature of an obstruction is recorded by smart glasses, or a graphic marker is used on the obstruction, or a spatial position of the obstruction is recorded, for example, an angle between the obstruction and the smart glasses is recorded by the gyroscope of the smart glasses, such that the obstruction is recognized when the smart glasses face towards this angle. The relative position of the obstruction and the observer is generally fixed, so the observed image of the obstruction itself does not change much. The recognition of the obstruction is achieved through such a characteristic that color and shape, etc. of the obstruction themself are relatively constant, so that accuracy of recognition of the obstruction can be improved. For example, the color of the obstruction is relatively fixed and is almost unchanged. When natural view changes, the color and shape of the obstruction themself do not change, through such characteristic, the obstruction or the visual blind area is recognized and calibrated. The obstruction portion in the natural view can be recorded and removed.

In an embodiment, no obstruction is found in the view, such that it is not necessary to perform an image replacement operation, and a pattern shot by a camera of the smart glasses may be used. If the smart glasses are transmissive smart glasses, the user may perform observations directly through the glasses without displaying, the user may directly see the natural view through the smart glasses. The smart glasses may be transmissive smart glasses, such as smart glasses which similar to googleglass and hololens.

Figure 4:
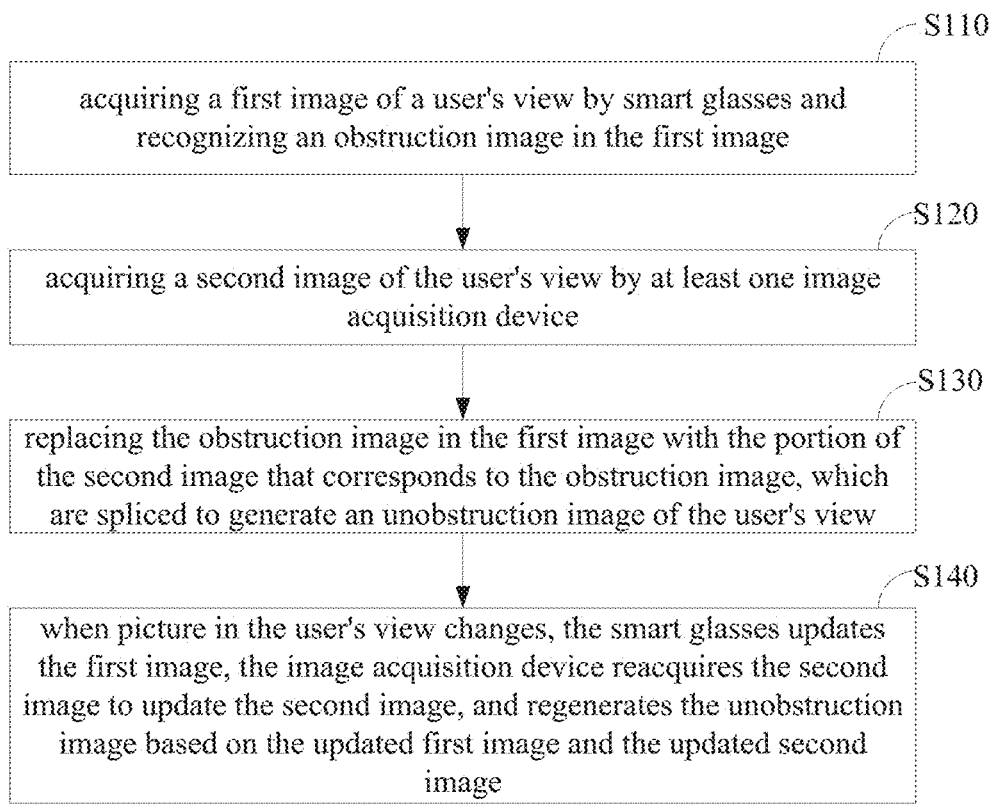
FIG. 4 is a flowchart of a method for seeing through an obstruction based on smart glasses according to a further embodiment of the invention.

FIG. 4 is a flowchart of a method for seeing through an obstruction based on smart glasses according to a further embodiment of the invention. As shown in FIG. 4, the method for seeing through an obstruction based on smart glasses as shown in FIG. 1 may further comprise the following steps:

S140: when picture in the user's view changes, the smart glasses updates the first image, the image acquisition device reacquires the second image to update the second image, and regenerates the unobstruction image based on the updated first image and the updated second image.

In the embodiment, when the view changes, for example when the user's head moves, the unobstruction image can be adjusted and updated in accordance with gyroscope data of the smart glasses itself. Specifically, the first image and the second image may be updated, and based on the updated first image and the updated second image, the unobstruction image is regenerated by the steps S120-S130. In this way, real-time update of the unobstruction image can be realized when the picture in the user's view changes. In an embodiment, the image acquisition device can acquire the second image in real time, and update the previous second image by using the reacquired second image when necessary.

In an embodiment, when viewing angle of the user of the smart glasses changes, firstly whether there is an obstruction in new view or not can be judged, then the above necessary steps are repeated. The method of judging an obstruction in the view may comprise: relatively complete image splicing is performed using the image acquisition device to form a complete image, the image is used as a template, by referring to the image shot by the smart glasses and gyroscope information of the smart glasses itself, part of image region on the template is selected as a view window, the view window acquired by the image acquisition device is compared with the image shot by the smart glasses itself to judge the obstruction. The obstructed image is replaced with the image acquired by the image acquisition device.

Figure 5:
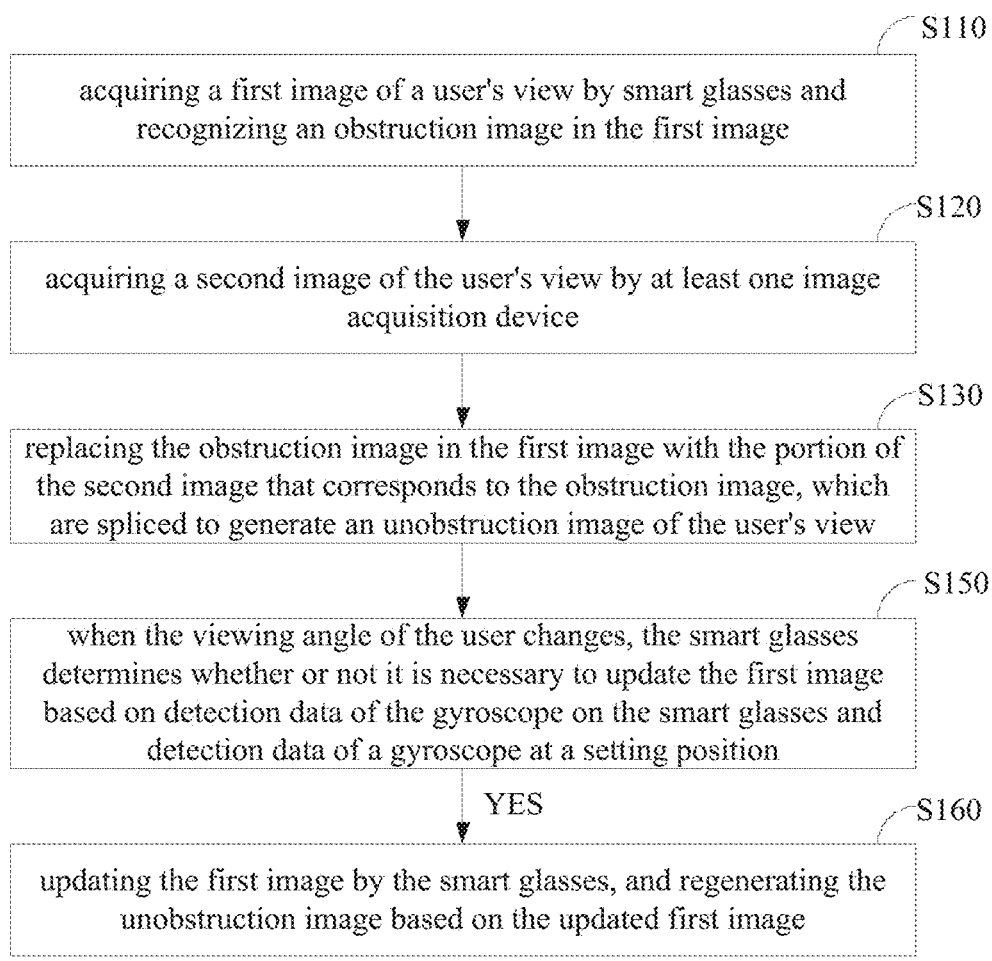
FIG. 5 is a flowchart of a method for seeing through an obstruction based on smart glasses according to another embodiment of the invention.

FIG. 5 is a flowchart of a method for seeing through an obstruction based on smart glasses according to further embodiment of the invention. As shown in FIG. 5, the method for seeing through an obstruction based on smart glasses as shown in FIG. 1 may further comprise the following steps:

S150: when the viewing angle of the user changes, the smart glasses determines whether or not it is necessary to update the first image based on detection data of the gyroscope on the smart glasses and detection data of a gyroscope at a setting position;

S160: if it is necessary to update the first image, updating the first image by the smart glasses, and regenerating the unobstruction image based on the updated first image.

In the step S150, the setting position may be positions outside the smart glasses, such as on a vehicle. The setting position refers to the position of the external image collector, that is, the position of the camera providing the second image. Change of the viewing angle of the user can be determined in various situations based on the detection data of the gyroscope on the smart glasses and the detection data of the gyroscope at the setting position, for example, whether or not the viewing angle of the user changes is determined during driving the vehicle.

In the step S160, when it is judged based on the detection data of the gyroscope on the smart glasses and the detection data of the gyroscope at the setting position that change of the viewing angle of the user exceeds a setting angle, the first image can be updated by the smart glasses, and the unobstruction image is generated based on the updated first image, so as to update the unobstruction image in real time when the viewing angle of the user changes.

In other embodiments, if it is judged based on the detection data of the gyroscope on the smart glasses and the detection data of the gyroscope at the setting position that change of the viewing angle of the user does not exceed the above setting angle, it can be approximately regarded that the viewing angle of the user does not change, the first image may not be updated. In an embodiment, the image acquisition device may be a camera, at this time the second image can be acquired in real time, and the second image can be updated in real time. The second image may be reacquired all the time and can be used for generating the unobstructed image as needed.

In the embodiment, the second image may or may not be reacquired as long as the second image still includes the user's view obstructed by the obstruction in the updated first image.

Figure 6:
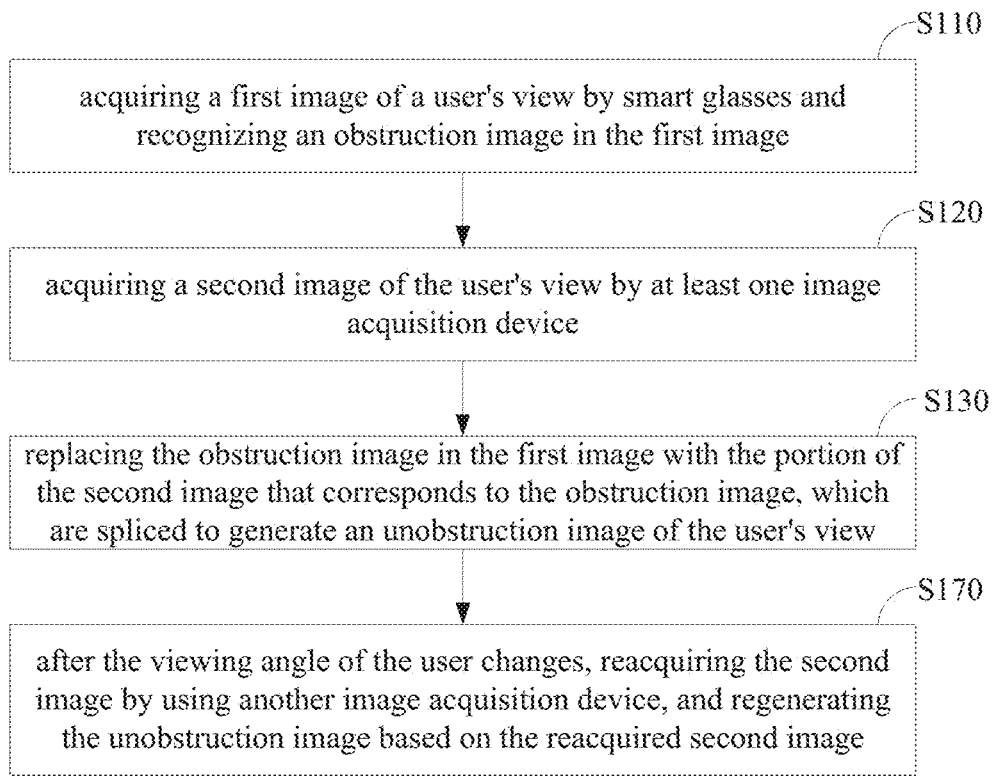
FIG. 6 is a flowchart of a method for seeing through an obstruction based on smart glasses according to another embodiment of the invention.

FIG. 6 is a flowchart of a method for seeing through an obstruction based on smart glasses according to another embodiment of the invention. As shown in FIG. 6, the method for seeing through an obstruction based on smart glasses as shown in FIG. 1 may further comprise the following steps:

S170: after the viewing angle of the user changes, reacquiring the second image by using another image acquisition device, and regenerating the unobstruction image based on the reacquired second image.

In the embodiment, the another image acquisition device is an image acquisition device that is used for acquiring the second image before the viewing angle of the user changes, and may be another of the multiple image acquisition devices above-described. The another image acquisition device can acquire an image of the user's view obstructed by the obstruction in a new viewing angle of the user. The another image acquisition device can be different from the image acquisition devices in terms of image acquisition angle and/or position. Based on different viewing angles of the user, the second image is acquired using different image acquisition devices, which can ensure that the obstruction can be seen through at more viewing angles of the user.

In an embodiment, in the method for seeing through an obstruction based on smart glasses as shown in FIG. 1, difference between a direction angle of the obstruction with respect to the user and an imaging viewing angle of the image acquisition device is less than 90 degrees.

In the embodiment, the difference between a direction angle of the obstruction with respect to the user and an imaging viewing angle of the image acquisition device is smaller than 90 degrees, which can overcome difference between a three-dimensional real space and an image expressing two-dimensional information and improve accuracy of the result of seeing through. In other embodiments, the difference between a direction angle of the obstruction with respect to the user and an imaging viewing angle of the image acquisition device may be other angles, for example, which can be determined based on an angle of field of view that can be acquired by the image acquisition device, for example which can be ½ of a viewing angle of a lens of the image acquisition device. In an embodiment, the viewing angle difference may be 30 degrees and less, so as to obtain a relatively ideal image. In another embodiment, the image acquisition device may use a wide-angle lens of 180 degrees, at this time the viewing angle difference can approach 90 degrees, such that an image of a panoramic lens can be obtained by splicing images acquired by multiple lenses.

Figure 7:
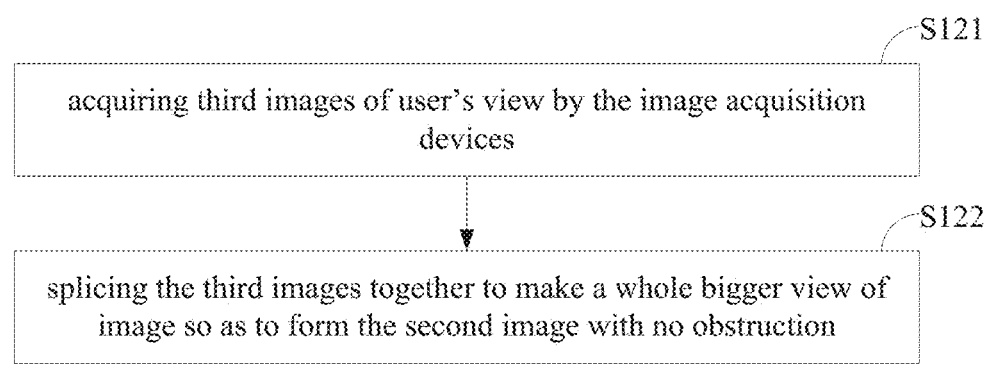
FIG. 7 is a flowchart of a method for acquiring a second image of the user's view by a plurality of image acquisition devices according to an embodiment of the invention.

FIG. 7 is a flow chart of a method for acquiring a second image of the user's view by multiply image acquisition devices according to an embodiment of the invention. The image acquisition devices may be in plural, as shown in FIG. 7, the method of acquiring the second image of the user's view by multiple image acquisition devices may comprise the following steps:

S121: acquiring third images of the user's view by the image acquisition devices;

S122: splicing the third images together to make a whole bigger view of image so as to form the second image with no obstruction.

In the step S121, viewing angles and/or positions of the image acquisition devices can be different, different third images can be acquired.

In the step S122, the second image with no obstruction is formed by splicing the third images together, such that when one image acquisition device cannot acquire a complete view image obstructed by the obstruction, parts of the view image obstructed by the obstruction that are acquired by the image acquisition devices are spliced together so as to form a complete view image obstructed by the obstruction, which can be used for replacing the obstruction image in the first image.

In another embodiment, the second image formed by splicing may be an image having a wider view than one of the third images. When the picture in the user's view changes and/or the user's viewing angle changes, as long as the second image can still include an image of view obstructed by the obstruction, the second image may not be updated. If the first image changes, an image of corresponding position of the updated first image can be found directly in the second image, thereby improving image processing speed.

Figure 8:
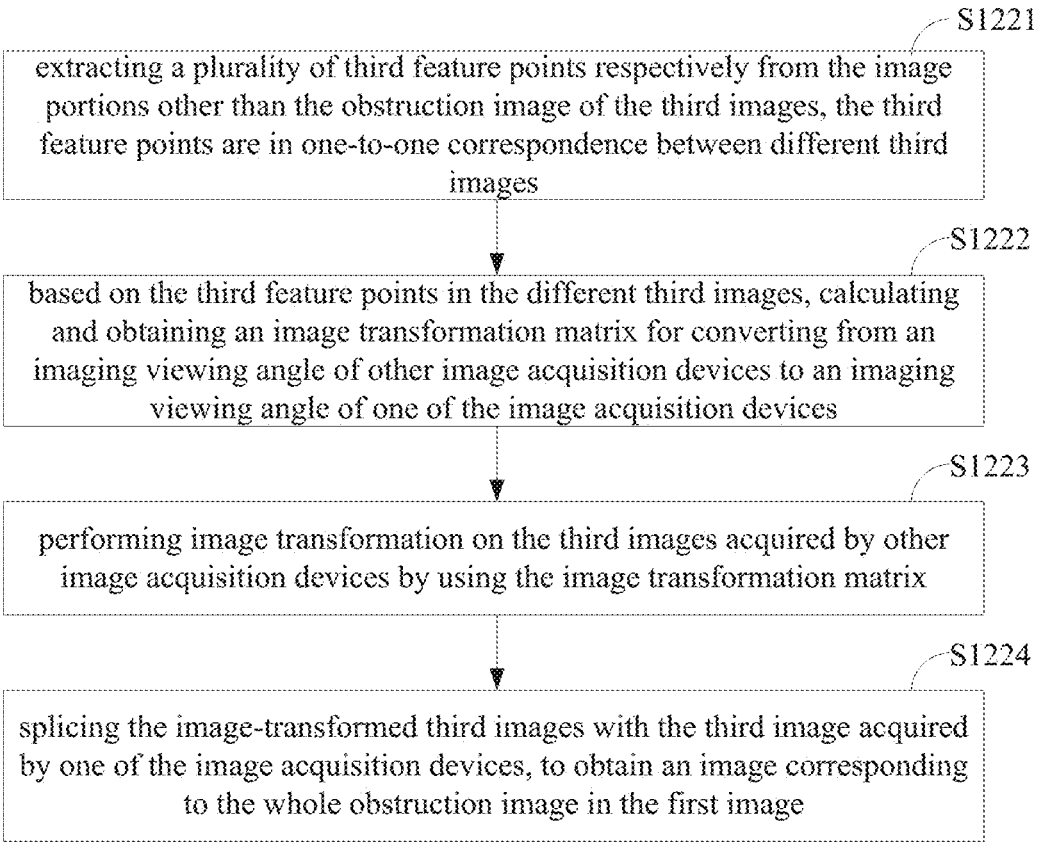
FIG. 8 is a flowchart of a method for splicing and obtaining a second image according to an embodiment of the invention.

FIG. 8 is a flowchart of a method for splicing and generating a second image according to an embodiment of the invention. As shown in FIG. 8, in the step S122, the method of splicing the third images together so as to form a second image with no obstruction may comprise the following steps:

S1221: extracting a plurality of third feature points respectively from image portions other than the obstruction image of the third images, the third feature points in different third images are in one-to-one correspondence;

S1222: based on the third feature points in the different third images, calculating and obtaining an image transformation matrix for converting from an imaging viewing angle of other image acquisition devices to an imaging viewing angle of one of image acquisition devices;

S1223: performing image transformation on the third images acquired by other image acquisition devices by using the image transformation matrix;

S1224: splicing the image-transformed third images with the third image acquired by one of the image acquisition devices, so as to obtain the image corresponding to the whole obstruction image in the first image.

In the embodiment, the specific implementation method can be similar to the splicing method shown in FIG. 2, for example in the step S1221, the third feature points can be extracted by a feature point extraction algorithm. In the step S1224, the obstruction image can be replaced with portion of the images to be spliced that corresponds to the obstruction image, then can be cut and spliced to form an image corresponding to the whole obstruction image in the first image.

In a specific embodiment, the method of seeing through an obstruction may comprise the following steps:

(1) recognizing the obstruction image using the smart glasses, determine an obstruction that needs to be seen through by recognizing external mark of a target object, or recording direction of the obstruction by a gyroscope of the smart glasses itself, or achieving the purpose of recognizing the obstruction itself. The recognition of the obstruction itself is mainly about the recognition of the shape and pattern of the obstruction.

(2) acquiring the obstructed image using an external detector.

(3) looking for corresponding feature points in an external image and a natural view where an obstruction exists.

(4) obtaining an image transformation matrix and the transformed external detector image. Use the corresponding feature points in step (3) to obtain an image transformation matrix, and apply the transformation matrix to an external image so that the external image is transformed into the image of the angle corresponding to the user's observation.

(5) overlapping the image into the original image with the obstruction.

(6) overlapping or replacing part of the obstruction image with a new image.

(7) when the image which the detector gets changes, repeating the above operations to make the image overlapped on the obstruction change continuously based on the obstructed content.

(8) when the smart glasses user's view changes, firstly detecting whether an obstruction exists or not, the image is not replaced if the obstruction does not exist, and the above operations (1) to (7) are repeated if the obstruction exists.

(9) using an image formed by splicing the images obtained by all detectors as a template, searching in the template by using the image shot by the smart glasses and information data of the gyroscope of the smart glasses as a window so as to obtain a corresponding image obstructed by the obstruction to complete replacement.

In the method of the embodiment, the visual blind area and the portion obstructed by the obstruction may possibly change in real time, this part of data may have real-time performance; the result of seeing through of a perspective-type smart glasses and its method for seeing through is inner structure of an object, the inner structure may be relatively fixed, and has no real-time performance, and may basically not change over time. The invention may be applied in places such as traffic and military visual blind area that are greatly dangerous, meanwhile since the obstructed object may be seen through in real time, it can ensure accurate and usable display result.

Figure 9:
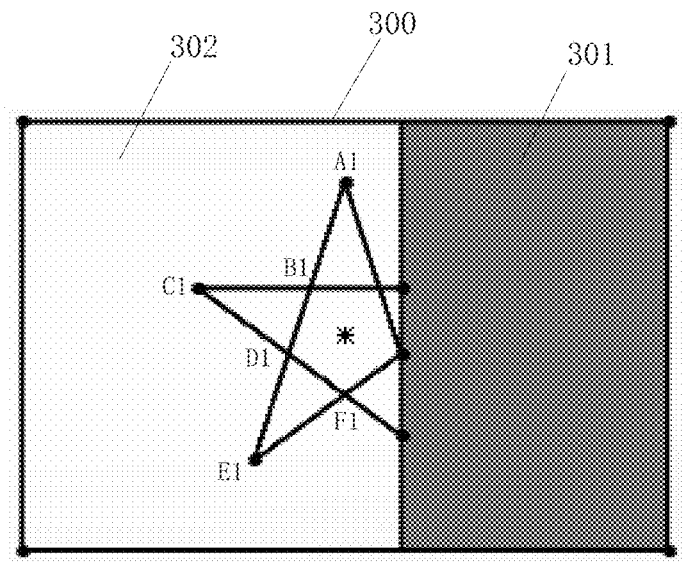
FIG. 9 is a schematic view of a first image acquired by smart glasses according to an embodiment of the invention.

FIG. 9 is a schematic view of a first image acquired by smart glasses according to an embodiment of the invention. An image saw by the smart glasses can be approximately regarded as an ithe natural view of the user. As shown in FIG. 9, a first image 300 acquired by the smart glasses includes an obstruction image 301 and an unobstruction image 302. A blind zone (corresponding to the obstruction image 301) of the user's view is at a right side of the view. In other embodiments, the blind zone may also possibly be at a left side, an upper side, a lower side, in the surrounding or at the center of the view, etc. In image portions other than the obstruction image 301 of the first image 300, i.e., in the unobstruction image 302, the inflection points or intersections points A1, B1, C1, D1, E1, F1 in first image 300 can be selected as feature points.

Figure 10:
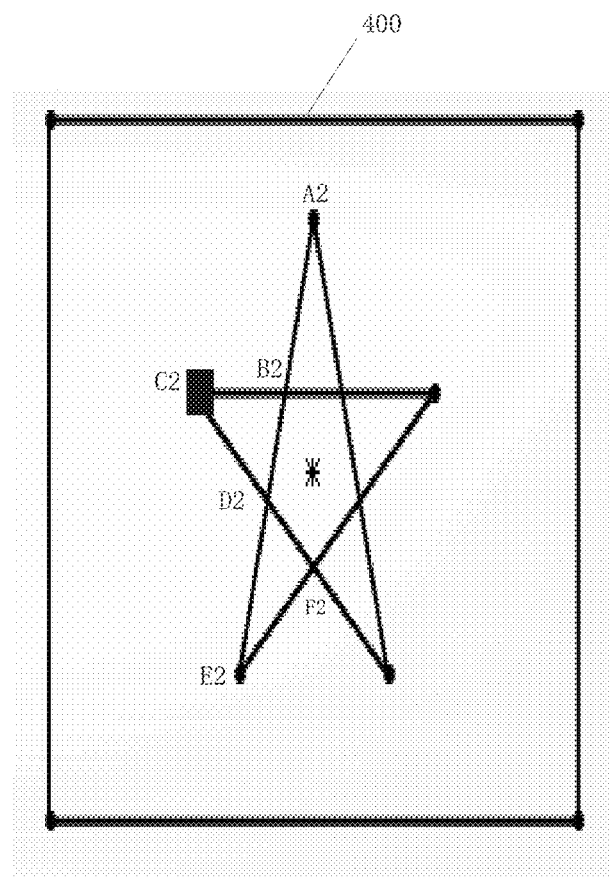
FIG. 10 is a schematic view of a second image acquired by an image acquisition device that includes a portion corresponding to the obstruction image as shown in FIG. 9 according to an embodiment of the invention.

FIG. 10 is a schematic view of a second image acquired by an image acquisition device that includes a portion corresponding to the obstruction image as shown in FIG. 9 according to an embodiment of the invention. As shown in FIG. 10, the acquired second image 400 includes not only an image corresponding to the obstruction image 301 in FIG. 9 but also an image at least partially corresponding to the unobstruction image 302. Second feature points A2, B2, C2, D2, E2, F2 corresponding to the first feature points A1, B1, C1, D1, E1, F1 may be found in the second image 400. A pentagram image in the second image 400 is deformed somewhat with respect to a pentagram image as shown in FIG. 9, and a position of the second feature point C2 corresponding to the first feature point C1 is unobstructed somewhat. But the second image 400 does should include the portion corresponding to the shelter image 301 in the first image 300 to use for fill in the obstruction image 301.

The first feature points A1, B1, C1, D1, E1, F1 in FIG. 9 and the second feature points A2, B2, C2, D2, E2, F2 in FIG. 10 may not necessarily overlap perfectly, after performing image transformation on of FIG. 10, the first feature points A1, B1, C1, D1, E1, F1 in FIG. 9 and the second feature points A2, B2, C2, D2, E2, F2 in FIG. 10 can overlap perfectly so as to realize image splicing and make the spliced image conform to eye's natural view.

In other embodiment, a plurality of image acquisition devices can be used to perform image acquisition so as to ensure that the unobstructed view can be covered completely. The images obtained by different image acquisition devices can be connected together by means of image splicing to obtain the second image 400.

Figure 11:
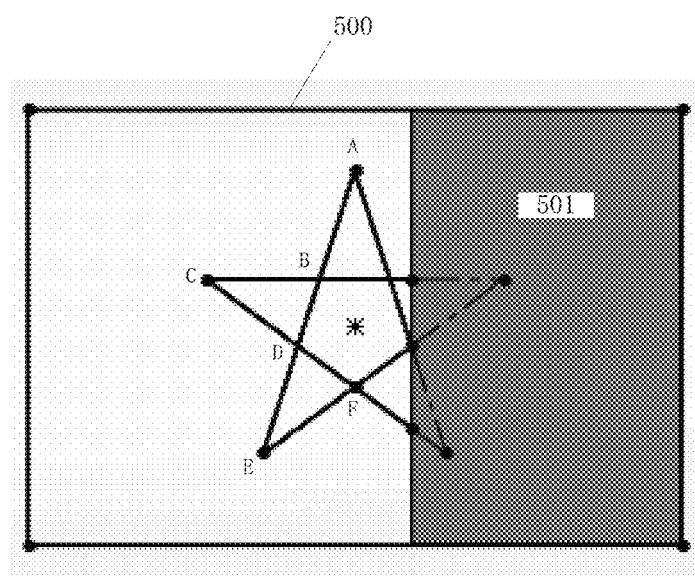
FIG. 11 is a schematic view of an unobstruction image that is generated by splicing the images as shown in FIGS. 9 and 10.

FIG. 11 is a schematic view of a unobstruction image that is generated by image mosaic as shown in FIGS. 9 and 10. As shown in FIG. 11, the obstruction image 301 in the first image 300 is replaced with a portion of the transformed second image 400 that corresponds to the obstruction image 301, such that an unobstruction image 500 can be obtained, wherein a replaced part image 501 is shown in virtual lines. The images are spliced together to form a complete image, or the image obstructed by the obstruction may also be shown by a virtual image, the visual blind area can be eliminated by this means. Finally the image of the obstructed portion acquired by the image acquisition device is spliced onto an image of the current view scope to complete the operation of seeing through an obstruction.

The method for seeing through an obstruction based on smart glasses according to an embodiment of the invention analyzes and recognizes a position and an image of an obstruction in the view through many methods based on an image of a user's view that is acquired by a camera of smart glasses, acquires an image of the obstructed view by an external image acquisition device, and replaces the obstructed portion with an image acquired by an external detector, then registers and splices the replacement image with the image of the user's view, in this way, an image obstructed by an obstruction can be seen when the obstruction is observed using the smart glasses, thus resulting in an effect of seeing through a obstruction, thereby effectively removing blind spots in the user's view that are caused by the obstruction.

The embodiment of the invention further provides a computer-readable storage medium including computer-readable instructions, when being executed, the computer-readable instructions cause a processor to perform at least the method for seeing through an obstruction.

Based on the same inventive concept as the method for seeing through an obstruction based on smart glasses as shown in FIG. 1, the embodiment of the application further provides an apparatus for seeing through an obstruction based on smart glasses, as described in the following embodiment. Because the principle for solving the problems by an apparatus for seeing through an obstruction based on smart glasses is similar to the method for seeing through an obstruction based on smart glasses, implementation of the apparatus for seeing through an obstruction based on smart glasses can refer to implementation of the method for seeing through an obstruction based on smart glasses, repetitions will not be described.

Figure 12:
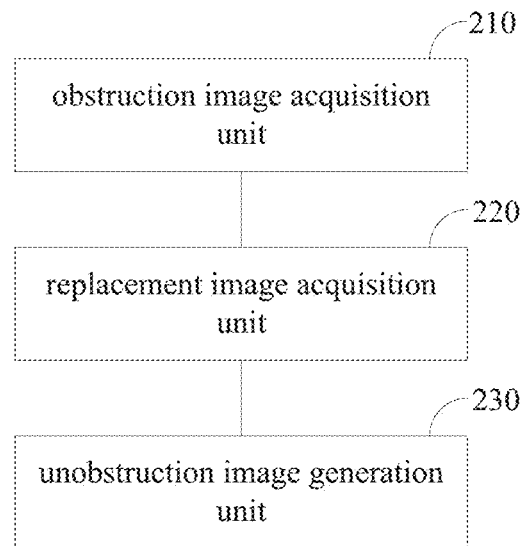
FIG. 12 is a structural view of the structure of the device provided according to an embodiment of the invention.

FIG. 12 is a structural view of an apparatus for seeing through a obstruction based on smart glasses according to an embodiment of the invention. As shown in FIG. 12, the apparatus for seeing through an obstruction based on smart glasses according to the embodiment of the invention may comprise an obstruction image acquisition unit 210, a replacement image acquisition unit 220 and an unobstruction image generation unit 230 which are connected in sequence.

The obstruction image acquisition unit 210 acquires a first image of a user's view by smart glasses and recognizes an obstruction image in the first image.

The replacement image acquisition unit 220 acquires a second image of the user's view by at least one image acquisition device.

The unobstruction image generation unit 230 replaces the obstruction image in the first image with portion of the second image that corresponds to the obstruction image, which are spliced to generate an unobstruction image of the user's view.

In the obstruction image acquisition unit 210, the smart glasses may be all kinds of different smart glasses on which an image acquisition device is generally disposed, such as a camera. The above-described user generally refers to a user wearing the smart glasses. Because the image acquisition device of the smart glasses is very close to the eyes, the image that can be seen by the user can also be captured by the smart glasses. A obstruction may cause blind spots to be generated in the user's view, the portion obstructed by an obstruction cannot be observed by the user, for example, stand columns of car windows may block part of view of a person in the car.

In an embodiment, it can be approximately regarded that the images seen by the user and by the smart glasses are the same, simple deformation of the images can be omitted so as to simplify image processing process.

In another embodiment, difference between the user's view, i.e., natural view, and the image seen by the image acquisition device of the smart glasses can be corrected or rectified based on position relationship between the eyes and the image acquisition device of the smart glasses, thereby improving realness of an image on a display screen of the smart glasses, which thus can improve user's experience.

In an embodiment, difference between the user's view, i.e., natural view, and the image seen by the image acquisition device of the smart glasses can be corrected by a camera calibration method using a bi-camera. Specifically, one camera can be placed at the position of the eyes, a calibration plate image acquired by the camera is compared with a calibration plate image acquired by the camera of the smart glasses so as to obtain a transformation matrix T of a image. All of the images acquired by the smart glasses are transformed by the matrix T before being displayed to the eyes, so as to obtain an image acquired and displayed approximately at position of the eyes.

The first image can be acquired by an image acquisition device on the smart glasses. An obstruction image in the first image can be obtained through image analysis performed by a processor of the smart glasses or an additionally disposed processor, i.e., whether an obstruction is in the user's view or not can be judged. There may be a plurality of obstructions in the user's view, and the above-described obstruction image may be in plural. In an embodiment, the obstruction shot by the camera of the smart glasses can be recognized to a certain degree, so as to judge which part of the image is used to replace the obstruction, the process of recognition using the smart glasses may also be assisted by a gyroscope equipment of the smart glasses itself, thereby the camera of the smart glasses can recognize whether there is an obstruction in the view or not and the obstruction is replaced with a corresponding image. Because the visual blind area of the whole view can be covered by the image acquisition device, images around the obstruction and the obstructed image can be got and spliced effectively, so as to better judge position of the view and to replace with the corresponding image.

In an embodiment, the smart glasses may be perspective-type smart glasses. A display screen of the perspective-type smart glasses may allow natural light to penetrate, so as to ensure that the user can see a natural and real view while observing the image displayed on the smart glasses. The image generated by the smart glassless may overlap with a target image in the real view, part of the obstruction image in the real view is covered by the processed image of the smart glasses, so as to achieve the effect of seeing through the obstruction. The obstructed image can be acquired and obtained by one or more image acquisition device, wherein at least one image acquisition device may not be obstructed by the obstruction.

In the replacement image acquisition unit 220, the image acquisition device may be various devices capable of acquiring images, such as a camera, an infrared image detector, etc. The above-described image acquisition device may be installed at various different positions as long as it can shoot the image of the user's view that is obstructed by the obstruction. In other words, it is necessary to cover the positions of the view obstructed by the obstruction, i.e., cover the visual blind area of the user, the image of the obstructed portion can be acquired, for example, the image acquisition device is disposed at a position on the top of the car roof, and thus can cover visual blind area of window stand columns.

Preferably, the image acquisition device is disposed on back side of the obstruction, thereby ensuring that the image of the user's view that is obstructed by the obstruction can certainly be acquired.

In an embodiment, when images of the view that are obstructed by all obstructions can be shot by one of the image acquisition devices, the second image may be acquired by using only one image acquisition device. In another embodiment, images of different portions of the view obstructed by the obstruction are shot simultaneously using a plurality of image acquisition devices, the images acquired by different image acquisition devices can be spliced together to generate an image including a view obstructed by all or overall obstruction.

In an embodiment, the positions of the above-described image acquisition device and the obstruction can be relatively fixed, thereby greatly reducing computation burden of image processing and thus improving image processing speed.

In unobstruction image generation unit 230, a portion of the second image that corresponds to the obstruction image may refer to an image of the user's view obstructed by the obstruction. For example, if stand columns of a car window block traffic lights within the user's view, a portion of the second image that corresponds to the obstruction image may be an image of the traffic lights. An image after seeing through the obstruction can be seen from the unobstruction image. The image acquired by the image acquisition device can be transmitted in many ways, such as in a wireless or wired way, to a processor to be processed. The processor may be a processor on the smart glasses or an additionally provided processor. The image acquisition device can acquire an image of the user's view obstructed by the obstruction in real time, and can update the unobstruction image displayed on the display screen of the smart glasses in real time.

In the embodiment of the invention, the image including the user's view obstructed by the obstruction is acquired by the image acquisition device, without knowing the image obstructed by the obstruction. By replacing the obstruction image in the first image with the portion of the second image that corresponds to the obstruction image and splicing the portions to generate the unobstruction image of the user's view, so as to see through the whole object of the obstruction. In this way, the defect that the existing smart glasses can only see through inner structure of the object rather than the whole object can be overcome, and limitations of the existing smart glasses that an image of the inner structure of the object needs to be known in advance can be broken through.

Figure 13:
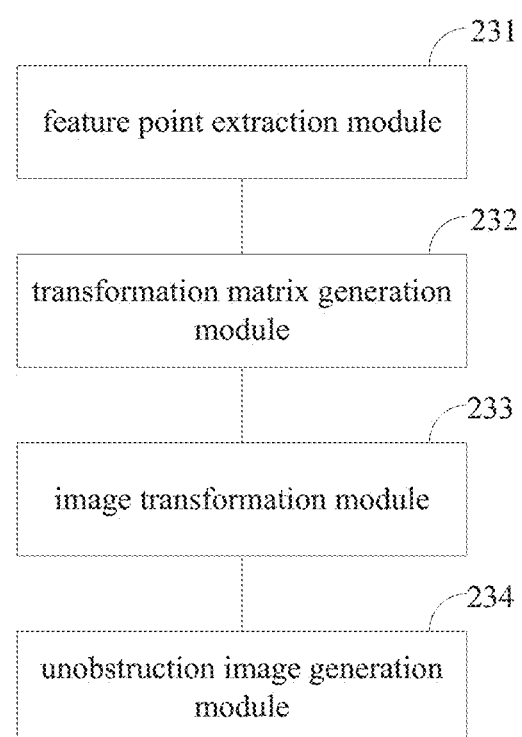
FIG. 13 is a structural view of an unobstruction image generation unit according to an embodiment of the invention.

FIG. 13 is a structural view of an unobstruction image generation unit according to an embodiment of the invention. As shown in FIG. 13, the unobstruction image generation unit 230 may comprise a feature point extraction module 231, a transformation matrix generation module 232, an image transformation module 233 and an unobstruction image generation module 234 which are connected in sequence.

The feature point extraction module 231 extracts a plurality of first feature points and a plurality of second feature points respectively from image portions other than the obstruction image of the first image and the second image. There is a corresponding relationship between the first feature points and the second feature points.

The transmission matrix generation module 232 calculates and obtains an image transformation matrix for converting from an imaging viewing angle of the image acquisition device to the user's viewing angle based on all of the first feature points and all of the second feature points.

The image transformation module 233 performs image transformation on the second image by utilizing the image transformation matrix.

The unobstruction image generation module 234 splices the portion of the image transformed second image that corresponds to the obstruction image and the first image with the obstruction image removed, so as to generate the unobstruction image.

In the feature point extraction module 231, the first feature points and the second feature points may be points in respective images that can reflect shape of an object, such as a vertex or an inflection point of an object in the image, which can be obtained by gradient change of intensity of the points.

Specifically which points in the images can serve as feature points can be determined as needed. The second feature points correspond to the first feature points in one-to-one correspondence, which means that the second feature points and the first feature points are points on images in the user's view that correspond to the same point of the object in view. The more the feature points are, the more accurate the image splicing is. In an embodiment, there are at least five pairs of paired feature points (the first feature points and the second feature points appear in pairs), which is beneficial for the correction and stability of image transformation matrix result.

In an embodiment, all of the first feature points in image portions other than the obstruction image of the first image can be extracted, all of the second feature points in the second image can be extracted, and feature vectors and feature values of corresponding feature points can be recorded, further the extracted all first feature points and all second feature points are matched based on the feature vectors and the feature values, and the first features and the second feature points that are matched successfully are used for calculating the image transformation matrix, i.e., number of the first feature points that are extracted initially may be different from the number of the second feature points that are extracted initially, for example, the number of the second feature points is larger than the number of the first feature points.

In the transformation matrix generation module 232 and the image transformation module 233, the second image is shot from the imaging viewing angle of the image acquisition device, the first image is shot from the user's viewing angle. When the imaging viewing angle and the user's viewing angle are different, common portion of the second image and the first image may generally has a relative deformation. the second image is image transformed using the image transformation matrix, and the second image is transformed from the imaging viewing angle of the image acquisition device to the user's viewing angle, thus image deformation problem can be eliminated.

In the unobstruction image generation module 234, the first image may be compared with the transformed second image so as to obtain portion of the transformed second image that corresponds to the obstruction image; the obstruction image in the first image is removed; then the portion of the transformed second image that corresponds to the obstruction image and the first image with the obstruction image removed are spliced together.

In the embodiment, the second image is image-transformed by the image transformation matrix and then is spliced so as to generate an unobstruction image, thereby preventing from the problem that the imaging of the obstructed portion isn't intuitive enough, which causes the confusion of the user's view and thus affects normal view of the user, in the case that an imaging viewing angle of the image acquisition device is not consistent with an angle of view of the user (an imaging viewing angle of the smart glasses).

In an embodiment, the feature point extraction module 231 may comprise a feature extraction algorithm module 2311.

The feature extraction algorithm module 2311 is used for extracting a plurality of first feature points and a plurality of second feature points respectively from image portions other than the obstruction image of the first image and the second image by a feature extraction algorithm.

An inflection point may be extracted by the above feature extraction algorithm, the inflection point refers to a point that greatly changes and differs from other surrounding pixel points. For example, if an image has a vertical edge, obviously left and right sides of the edge both change and differ greatly from a pixel of the line on which the edge is located, but this edge cannot serve as a feature point (i.e., an inflection point) because an edge is a line and there are too many points on a line, it is impossible to accurately judge which point can serve as an inflection point. For another example, if two edges intersect, there must be an intersection, and this intersection differs greatly from its surrounding pixels in any direction. This intersection is a unique one and may not produce multiple inflection points along the edge, so that this intersection can be selected as a feature point, i.e., an inflection point. Thus it can be seen that a feature point may generally be a sharp-angled position of an object in the image. The feature points include the first feature points and the second feature points.

In an embodiment, the unobstruction image generation module 234 is further used for performing the following step: the setting pixel width area of an edge of the first image with the obstruction image removed includes part of the obstruction image.

In the embodiment, part of the obstruction image is removed while the obstructed edge portion is reserved, which can be the basis of image splicing, and improve image splicing quality. When the obstructed portion is removed, the unobstructed portion may be reserved. When the images are spliced, the portion of the image connecting the unobstructed portion and the obstructed portion may be processed when being displayed, such that the displaying looks more natural. The value of the reserved edge portion may use a fixed pixel, or width thereof may be decided based on a difference value between the spliced pixels. In an embodiment, width of the edge portion is not less than 5 pixels, thereby facilitating the image to be displayed smoothly.

In another embodiment, the width of the edge portion may be 0-5 pixels, or an edge of the obstruction may be dilated such that the removed obstruction image may be larger than an actual obstruction image, thereby the spliced image looks more natural and more smooth.

Figure 14:
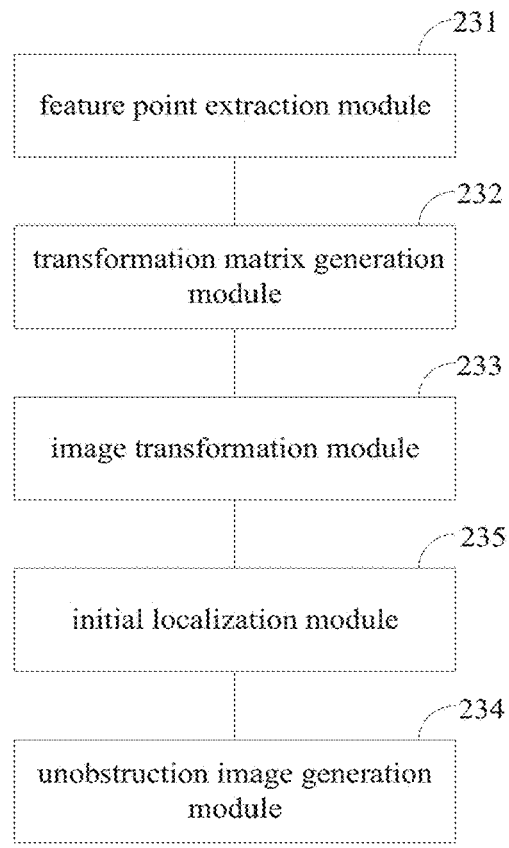
FIG. 14 is a structural view of an unobstruction image generation unit according to an embodiment of the invention.

FIG. 14 is a structural view of an unobstruction image generation unit according to an embodiment of the invention. As shown in FIG. 14, the unobstruction image generation unit 230 may further comprise an initial localization module 235 which is connected between the image transformation module 233 and the unobstruction image generation module 234.

The initial localization module 235 is used for initially localizing the spliced position between the portion of the image-transformed second image that corresponds to the obstruction image and the first image with the obstruction image removed, based on image acquisition angle and spatial location information of the image acquisition device.

In the initial localization module 235, preferably the positions of the image acquisition device and the obstruction is relatively fixed, and there is a certain relative relationship between the obstructed image and an image acquired by the image acquisition device. The spatial position information may be a relative spatial position of the image acquisition device and the obstruction, at this time, when the position of the obstruction is found, information of the relative spatial position may be recorded, on this condition, it can be regarded that there is no relative movement between the obstruction and the image acquisition device, so that the position information of the obstruction can be located and the image is spliced utilizing the position information. For example, there is an obstruction in an angle direction, so that information acquired by the image acquisition device in this angle direction can be used to replace the obstruction image. In this way, when splicing images using the smart glasses, scope of an image in which corresponding feature points (first feature points and corresponding second feature points) need to be searched in the splicing process can be greatly reduced, thereby improving image processing speed.

In an embodiment, meanwhile a gyroscope of the smart glasses itself can be utilized to supply information such as direction, angle relation between the obstruction and the smart glasses can be known in advance, that is, whether the user observes towards direction of the obstruction or not, and this can be an auxiliary basis for judging whether to display a perspective image or a splicing budget. In an embodiment, in the case that there may be multiple image acquisition devices, relative positions between multiple image acquisition devices may be fixed, hereby images of the multiple image acquisition devices are spliced for one time, after that, it is only necessary to reserve the image transformation matrix and apply it to a new image, it is not necessary to extract features for the image and look for corresponding feature points each time, so as to improve the image processing speed.

In an embodiment, the obstruction image acquisition unit 210 may comprise an obstruction image acquisition module 211.

The obstruction image acquisition module 211 is used for recognizing the obstruction image in the first image based on a constant property of the obstruction or a graphic marker on the obstruction.

Specifically, the obstruction image can be recognized based on, for example, a boundary region where the graphic marker is located. An image boundary can be extracted during image processing of the first image, such that the whole first image can be divided into many regions, the region where the constant property or the graphic marker is located can be regarded as an obstruction, and the image of the region can be replaced.

In the embodiment, the graphic marker may be a unique marker that is preset on the obstruction, and used for recognizing the obstruction. The method of recognizing the obstruction image in the first image can include recognizing color, pattern, relative position or feature identifier or the like of the obstruction. Color may mean that the color of the obstruction is relatively constant, the color of the obstruction can be defined in a certain range through acquisition for a period of time, such that the object having such color can be weighted somewhat in judgment of the obstruction. The pattern and the feature identifier are in substance the same, we can also use particular pattern as a marker for obstruction recognition to mark the outline of the pattern object as the obstruction. The relative position may mean that relative relationship between the obstruction and the user is recorded in the manner of a gyroscope, so as to be applied in recognition of the obstruction. The method of recognizing the obstruction may be an object recognition algorithm.

A feature of an obstruction is recorded by smart glasses, or a graphic marker is used on the obstruction, or a spatial position of the obstruction is recorded, for example, an angle between the obstruction and the smart glasses is recorded by the gyroscope of the smart glasses, such that the obstruction is recognized when the smart glasses face towards this angle. The visual blind area and the obstruction per se may generally not change very much, recognition of the obstruction is achieved based on such a characteristic that property of the obstruction itself is relatively constant, so that accuracy of recognition of the obstruction can be improved. For example, the color of the obstruction is relatively fixed and is almost unchanged. When natural view changes, the obstruction or the visual blind area is recognized and calibrated based on the characteristic which the obstruction itself does not change. The obstruction portion in the natural view can be recorded and removed.

In an embodiment, no obstruction is found in the view, so that it is not necessary to perform an image replacement operation, and a pattern shot by a camera of the smart glasses can be used. If the smart glasses are transmissive smart glasses, the user may observe directly through lenses without displaying, the user may directly see the natural view through the smart glasses, the smart glasses may be transmissive smart glasses, such as smart glasses similar to googleglass and hololens.

Figure 15:
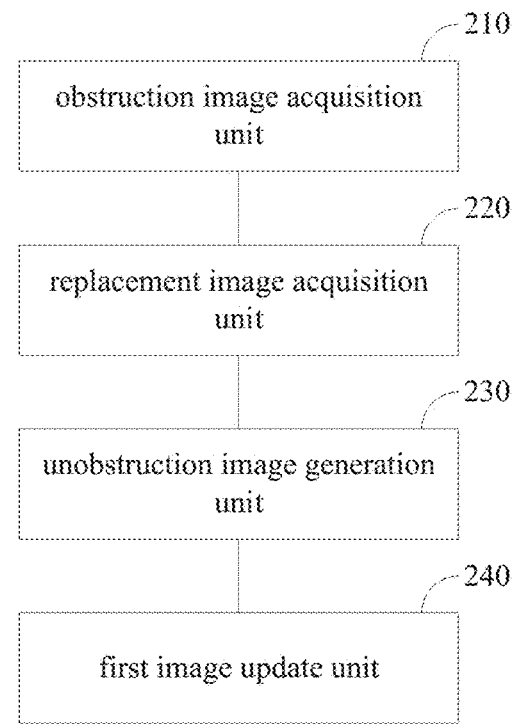
FIG. 15 is a structural view of an apparatus for seeing through an obstruction based on smart glasses according to another embodiment of the invention.

FIG. 15 is a structural view of an apparatus for seeing through an obstruction based on smart glasses according to another embodiment of the invention. As shown in FIG. 15, the apparatus for seeing through an obstruction based on smart glasses as shown in FIG. 12 may further comprise a first image update unit 240 which is connected with the unobstruction image generation unit 230.

The first image update unit 240 is used such that when picture in the user's view changes, the smart glasses update the first image, the image acquisition device reacquires the second image to update the second image, and regenerates the unobstruction image based on the updated first image and the updated second image.

In the embodiment, when the obstructed natural view changes, for example when the user's head moves, the unobstruction image can be updated and adjusted in accordance with gyroscope data of the smart glasses itself. Specifically, the first image and the second image can be updated, and the unobstruction image and the updated second image are regenerated based on the updated first image. In this way, real-time updating of the unobstruction image can be realized when the picture in the user's view changes. In an embodiment, the image acquisition device can acquire the second image in real time, and reacquires the second image before updating by using the reacquired second image as needed.

Figure 16:
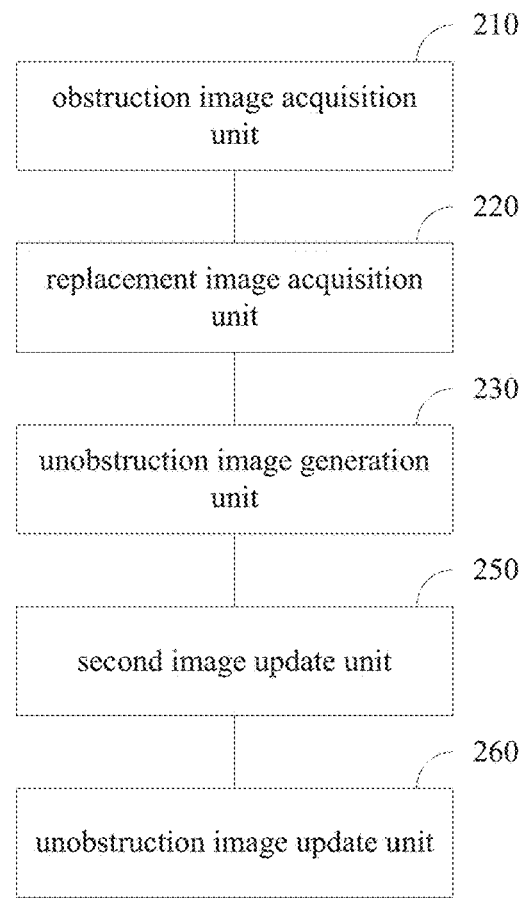
FIG. 16 is a structural view of an apparatus for seeing through an obstruction based on smart glasses according to another embodiment of the invention.

FIG. 16 is a structural view of an apparatus for seeing through an obstruction based on smart glasses according to another embodiment of the invention. As shown in FIG. 16, the apparatus for seeing through an obstruction based on smart glasses as shown in FIG. 12 may further comprise a second image update unit 250 and an unobstruction image update unit 260 which are connected to each other, wherein the second image update unit 250 is connected with the unobstruction image generation unit 230.

The second image update unit 250 is used such that when the viewing angle of the user changes, the smart glasses determines whether or not it is necessary to update the first image based on detection data of the gyroscope on the smart glasses and detection data of a gyroscope at a setting direction.

The unobstruction image update unit 260 is used such that if it is necessary to update the first image, the first image is updated by the smart glasses, and the unobstruction image is regenerated based on the updated first image.

In the second image update unit 250, the setting position may be positions outside the smart glasses, such as on a vehicle. Change of the viewing angle of the user can be determined in various situations based on the detection data of the gyroscope on the smart glasses and the detection data of the gyroscope at the setting position, for example, whether or not the viewing angle of the user changes is determined during driving the vehicle.

In the unobstruction image update unit 260, when it is judged based on the detection data of the gyroscope on the smart glasses and the detection data of the gyroscope at the setting position that change of the viewing angle of the user exceeds a setting angle, the first image can be updated by the smart glasses, and the unobstruction image is generated based on the updated first image, so as to update the unobstruction image in real time when the viewing angle of the user changes.

In other embodiments, if it is judged based on the detection data of the gyroscope on the smart glasses and the detection data of the gyroscope at the setting position that change of the viewing angle of the user does not exceed the above setting angle, it can be approximately regarded that the viewing angle of the user does not change, then the first image may not be updated.

In the embodiment, the second image may or may not be reacquired, as long as the second image still can include the user's view obstructed by the obstruction in the updated first image. In an embodiment, the image acquisition device may be a camera, at this time the second image can be acquired in real time, and the second image can be updated in real time, the second image may be reacquired all the time and can be used for generating the unobstruction image as needed.

Figure 17:
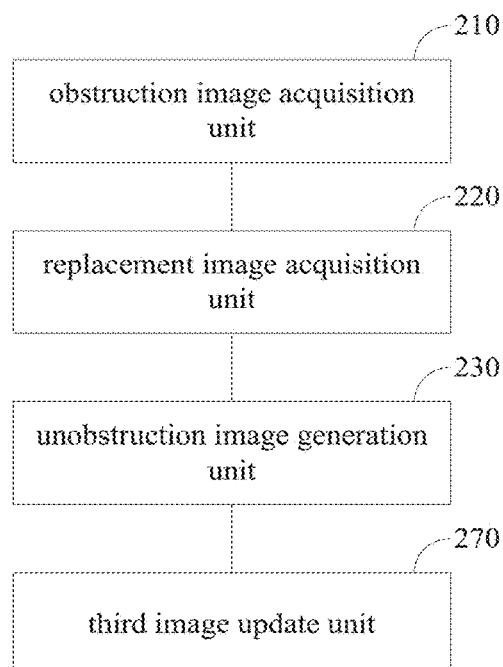
FIG. 17 is a structural view of an apparatus for seeing through an obstruction based on smart glasses according to a further embodiment of the invention.

FIG. 17 is a structural view of an apparatus for seeing through an obstruction based on smart glasses according to a further embodiment of the invention. As shown in FIG. 17, the apparatus for seeing through an obstruction based on smart glasses as shown in FIG. 12 may further comprise a third image update unit 270 which is connected with the unobstruction image generation unit 230.

The third image update unit 270 is used such that after the viewing angle of the user changes, the second image is reacquired by using another image acquisition device, and unobstruction image is regenerated based on the reacquired second image.

In the embodiment, the another image acquisition device is an image acquisition device used for acquiring the second image before the viewing angle of the user changes, and may be another of the above-described multiple image acquisition devices. The another image acquisition device can acquire an image of the user's view obstructed by the obstruction in a new viewing angle of the user. The another image acquisition device can be different from the image acquisition devices in terms of image acquisition angle and/or position. Based on different viewing angles of the user, the second image is acquired using different image acquisition devices, which can ensure that the viewing angle of seeing through an obstruction by a user is wider.

In an embodiment, the replacement image acquisition unit 220 is further used such that difference between a direction angle of the obstruction with respect to the user and an imaging viewing angle of the image acquisition device is around 90 degrees.

In the embodiment, the difference between a direction angle of the obstruction with respect to the user and an imaging viewing angle of the image acquisition device is smaller than 90 degrees, which can overcome difference between a three-dimensional real space and an image expressing two-dimensional information and improve accuracy of the result of seeing through. In other embodiments, the difference between a direction angle of the obstruction with respect to the user and an imaging viewing angle of the image acquisition device may be other angles, for example, can be determined based on an angle of field of view that can be acquired by the image acquisition device, for example can be ½ of a viewing angle of a lens of the image acquisition device. In an embodiment, the viewing angle difference may be 30 degrees and less, so as to obtain a relatively ideal image. In another embodiment, the image acquisition device may use a wide-angle lens of 180 degrees, at this time the viewing angle difference can approach 90 degrees, such that an image of a panoramic lens can be obtained by splicing images acquired by multiple lenses.

Figure 18:
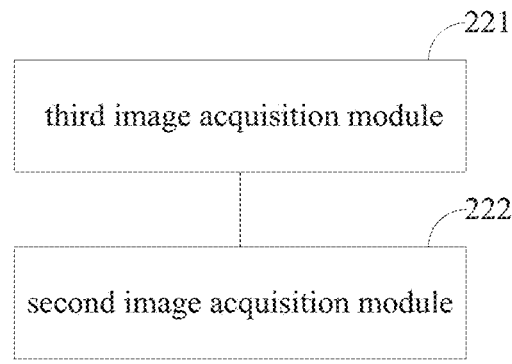
FIG. 18 is a structural view of a replacement image acquisition unit according to an embodiment of the invention.

FIG. 18 is a structural view of a replacement image acquisition unit according to an embodiment of the invention. As shown in FIG. 18, the image acquisition devices may be in plural, the replacement image acquisition unit 220 may comprise a third image acquisition module 221 and a second image acquisition module 222 which are connected with each other.

The third image acquisition module 221 is used for acquiring third images of the user's view by the image acquisition devices.

The second image acquisition module 222 is used for splicing the third images together to form the unobstruction second image.

In the third image acquisition module 221, viewing angles and/or positions of the image acquisition devices can be different, different third images can be acquired.

In the second image acquisition module 222, the unobstruction second image is formed by splicing the third images together, such that when one image acquisition device cannot acquire a complete view image obstructed by the obstruction, parts of the view image obstructed by the obstruction that are acquired by the image acquisition devices are spliced together to form a complete view image obstructed by the obstruction, so as to be used for replacing the obstruction image in the first image.

In another embodiment, the spliced second image may be an image having a wider view than one of the third images. When the picture in the user's view changes and/or the user's viewing angle changes, as long as the second image can still include an image of view obstructed by the obstruction, the second image may not be updated. If the first image changes, an image of corresponding position of the updated first image can be found directly in the second image, thereby improving image processing speed.

Figure 19:
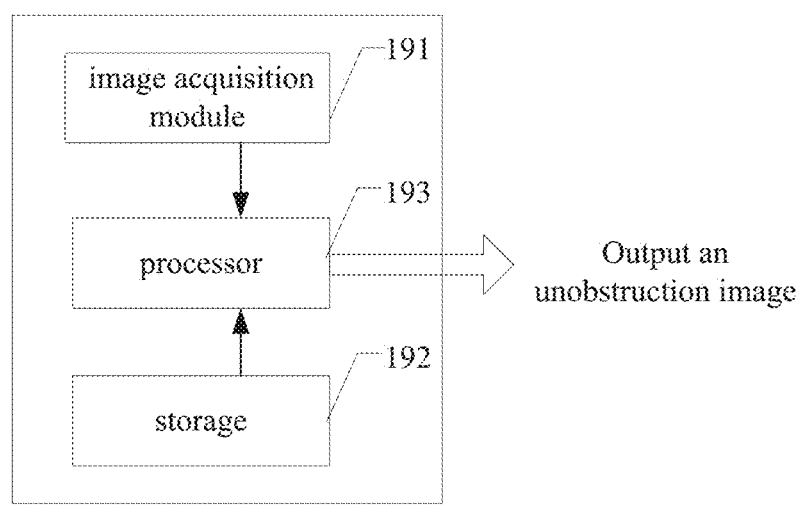
FIG. 19 is a structural view of the structure of the device provided according to the embodiment of the invention.

Meanwhile, the embodiment of the invention further provides a device, FIG. 19 shows a structural view of structure of the device provided according to the invention, the device comprising:

an image acquisition module 191 for acquiring an image of user's view;

a storage 192 for storing a program instruction;

a processor 193 which is connected with the image acquisition module and the storage, executes the program instruction in the storage, and processes the image of the user's view in accordance with the following steps:

1) acquiring a first image of a user's view by smart glasses and recognizing an obstruction image in the first image;

2) acquiring a second image of the user's view by at least one image acquisition device;

3) replacing the obstruction image in the first image with portions of the second image that correspond to the obstruction image, and splicing them to generate an unobstruction image of the user's view.

The apparatus and device for seeing through an obstruction based on smart glasses according to an embodiment of the invention analyzes and recognizes a position and an image of an obstruction in the user's view through many methods based on an image of a user's view that is acquired by a camera of smart glasses, acquires an image of the obstructed view by an external image acquisition device, and replaces the obstructed portion with an image acquired by an external detector, then registers and splices the replacement image with the image of the user's view, in this way, an image obstructed by a obstruction can be seen when the obstruction is observed using the smart glasses, thus resulting in an effect of seeing through an obstruction, thereby effectively removing blind spots in the user's view that are caused by the obstruction.

In the description, reference terms "one embodiment", "one specific embodiment", "some embodiments", "for example", "example", "specific example" or "some examples" are used to mean that specific features, structures, materials or characteristics described by combining the embodiment or example are included in at least one embodiment or example of the invention. In the description, exemplary expression of the above terms does not necessarily refer to the same embodiment or example. Moreover, the described specific features, structures, materials or characteristics may be combined in a suitable manner in any one or more of the embodiments or examples.

Persons skilled in the art shall understand that, the embodiments of the present invention can be provided as a method, a system or a computer program product. Therefore, the present invention can adopt the forms of a full hardware example, a full software example, or combination of a software example and a hardware example. Moreover, the present invention can adopt the form of a computer program product that is implemented on one or more computer-usable storage medium (including but not limited to a disk memory, a CD-ROM, an optical memory, and etc.) including computer-usable program codes.

The invention is described with reference to flow diagrams and/or block diagrams of the method, the device (system) and the computer program product according to the embodiment of the invention. It should be understood that each flow and/or block in the flow diagrams and/or block diagrams, and the combination of the flows and/or blocks in the flow diagrams and/or block diagrams can be achieved by computer program commands. These computer program commands can be provided to processors of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the processors of the computer or other programmable data processing device.

These computer program commands can also be stored in a computer-readable memory that can guide a computer or other programmable data processing device to operate in a special way, so that the command stored in the computer-readable memory generates a manufactured product including a command device which achieves functions designated in one or more flows in the flow diagrams and/or one or more blocks in the block diagrams.

These computer program commands can also be loaded on a computer or other programmable data processing device, on which a series of operation steps are executed to generate processing achieved by the computer, so that the command executed on the computer or other programmable data processing device is provided for achieving the steps of functions designated in one or more flows in the flow diagrams and/or one or more blocks in the block diagrams.

The purpose, technical solution and beneficial effect of the invention have been further described in detail in the above specific embodiments, it should be understood that the above contents are merely specific embodiments of the invention and are not used for limiting protection scope of the invention, and any modifications, equivalent replacements, improvements and the like within the spirit and principle of the present invention shall be included within the protection scope of the present invention.

The invention claimed is:

1. A method for seeing through an obstruction based on smart glasses, comprising:

acquiring a first image of a user's view by smart glasses and recognizing an obstruction image in the first image;

acquiring a second image of the user's view by at least one image acquisition device;

replacing the obstruction image in the first image with portion of the second image that corresponds to the obstruction image, including steps of:

extracting a plurality of first feature points and a plurality of second feature points respectively from image portions other than the obstruction image of the first image and the second image, the second feature points correspond to the first feature points in one-to-one correspondence:

calculating and obtaining an image transformation matrix for converting from an imaging viewing angle of the image acquisition device to the user's viewing angle from based on all of the first feature points and all of the second feature points:
  performing image transformation on the second image using the image transformation matrix;
  splicing the portion of the image transformed second image that corresponds to the obstruction image and the first image with the obstruction image removed, so as to generate an unobstruction image of the user's view.

2. The method for seeing through an obstruction based on smart glasses according to claim 1, wherein, extracting a plurality of first feature points and a plurality of second feature points respectively from image portions other than the obstruction image of the first image and the second image, includes:
  extracting a plurality of first feature points and a plurality of second feature points respectively from image portions other than the obstruction image of the first image and the second image by a feature extraction algorithm.

3. The method for seeing through an obstruction based on smart glasses according to claim 1, wherein,
  the setting pixel width area of an edge of the first image with the obstruction image removed includes part of the obstruction image.

4. The method for seeing through an obstruction based on smart glasses according to claim 1, wherein, before generating the unobstruction image by splicing the portion of the image transformed second image that corresponds to the obstruction image and the first image with the obstruction image removed together, further comprising:
  initially localizing the splicing position of the portion of the image-transformed second image that corresponds to the obstruction image with the first image with the obstruction image removed, based on image acquisition angle and spatial location information of the image acquisition device.

5. The method for seeing through an obstruction based on smart glasses according to claim 1, wherein, recognizing the obstruction image in the first image by the smart glasses, includes:
  recognizing the obstruction image in the first image based on a constant property of the obstruction or a graphic marker on the obstruction.

6. The method for seeing through an obstruction based on smart glasses according to claim 1, further comprising:
  when picture in the user's view changes, the smart glasses updates the first image, the image acquisition device reacquires the second image so as to update the second image, and regenerates the unobstruction image based on the updated first image and the updated second image.

7. The method for seeing through an obstruction based on smart glasses according to claim 1, further comprising:
  when the viewing angle of the user changes, the smart glasses determines whether or not it is necessary to update the first image based on detection data of the gyroscope on the smart glasses and detection data of a gyroscope at a setting position;
  if it is necessary to update the first image, the first image can be updated by the smart glasses, and the unobstruction image can be regenerated based on the updated first image.

8. The method for seeing through an obstruction based on smart glasses according to claim 1, further comprising:
  after the viewing angle of the user changes, reacquiring the second image by using another image acquisition device, and regenerating the unobstruction image based on the reacquired second image.

9. The method for seeing through an obstruction based on smart glasses according to claim 1, wherein, difference between a direction angle of the obstruction with respect to the user and an imaging viewing angle of the image acquisition device is smaller than 90 degrees.

10. The method for seeing through an obstruction based on smart glasses according to claim 1, wherein, the image acquisition devices may be in plural, acquiring the second image of the user's view by multiple image acquisition devices, includes:
  acquiring third images of the user's view by each of the image acquisition device;
  splicing the third images together to form the second image with no obstruction.

11. A non-transitory computer-readable storage medium including computer-readable instructions, wherein, when being executed, the computer-readable instructions cause a processor to perform at least operations according to claim 1.

12. A device, comprising:
  an image acquisition module for acquiring an image of user's view;
  a storage for storing a program instruction;
  a processor which is connected with the image acquisition module and the storage, executes the program instruction in the storage, and processes the image of the user's view in accordance with the steps according to claim 1.

* * * * *